(12) United States Patent
Lee

(10) Patent No.: US 11,355,769 B2
(45) Date of Patent: *Jun. 7, 2022

(54) APPARATUS AND METHOD FOR MANUFACTURING MEMBRANE-ELECTRODE ASSEMBLY OF FUEL CELL

(71) Applicants: HYUNDAI MOTOR COMPANY, Seoul (KR); KIA MOTORS CORPORATION, Seoul (KR)

(72) Inventor: Jin Won Lee, Boryeong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/100,150

(22) Filed: Nov. 20, 2020

(65) Prior Publication Data
US 2021/0328245 A1    Oct. 21, 2021

(30) Foreign Application Priority Data
Apr. 17, 2020 (KR) .......................... 10-2020-0046617

(51) Int. Cl.
  *H01M 8/10*    (2016.01)
  *H01M 4/88*    (2006.01)
  *H01M 8/1004*    (2016.01)
(52) U.S. Cl.
  CPC ....... *H01M 8/1004* (2013.01); *H01M 4/8814* (2013.01); *H01M 4/8875* (2013.01); *H01M 4/8896* (2013.01)

(58) Field of Classification Search
  CPC ............. H01M 4/8814; H01M 4/8875; H01M 4/8896; H01M 8/1004; B32B 37/0053; B32B 41/00; B32B 2041/04; B32B 2041/06; B32B 2457/18
  See application file for complete search history.

(56) References Cited

U.S. PATENT DOCUMENTS

| | | | | |
|---|---|---|---|---|
| 2002/0174782 | A1* | 11/2002 | Klug | B44B 5/0047 101/3.1 |
| 2010/0051181 | A1* | 3/2010 | Mori | H01M 4/8828 156/184 |
| 2010/0167176 | A1* | 7/2010 | Kawai | H01M 4/8896 429/523 |
| 2018/0337410 | A1* | 11/2018 | Lee | H01M 4/8896 |
| 2020/0153015 | A1 | 5/2020 | Lee | |

* cited by examiner

*Primary Examiner* — Brittany L Raymond
(74) *Attorney, Agent, or Firm* — Lempia Summerfield Katz LLC

(57) ABSTRACT

A manufacturing apparatus of a membrane-electrode assembly for a fuel cell includes: an electrode film sheet unwinder for supplying upper and lower electrode film sheets having upper and lower electrode films with anode and cathode layers along a predetermined transfer path, an electrolyte membrane sheet unwinder that supplies an electrolyte membrane sheet, a driving bonding roll that has an engraved portion and an embossing portion, a driven bonding roll that is to be moved in the vertical direction toward the driving bonding roll, a film rewinder that recovers, by winding, the upper and lower electrode films, and a position aligning unit that aligns the positions of the anode layer and the cathode layer while switching the running directions of the upper and lower electrode film sheets and the upper and lower electrode films.

20 Claims, 10 Drawing Sheets

APPARATUS AND METHOD FOR MANUFACTURING MEMBRANE-ELECTRODE ASSEMBLY OF FUEL CELL

CROSS-REFERENCE TO RELATED APPLICATION

This application claims priority to and the benefit of Korean Patent Application No. 10-2020-0046617, filed on Apr. 17, 2020, the entire contents of which are incorporated herein by reference.

FIELD

The present disclosure relates to a system for manufacturing parts of a fuel cell stack. More particularly, the present disclosure relates to an apparatus and a method for manufacturing a membrane-electrode assembly for a fuel cell.

BACKGROUND

The statements in this section merely provide background information related to the present disclosure and may not constitute prior art.

As is known, fuel cells produce electricity through an electrochemical reaction between hydrogen and oxygen. Fuel cells may continuously generate electric power upon receiving a chemical reactant from the outside, even without a separate charging process.

A fuel cell may be formed by disposing separators (or bipolar plates) on both sides of a membrane-electrode assembly (MEA) intervening therebetween. A plurality of fuel cells may be continuously arranged to form a fuel cell stack.

Here, a membrane-electrode assembly that is an example of a core component of the fuel cell is a three-layer structure. The three-layer structure includes an electrolytic membrane in which hydrogen ions transfer, an anode catalyst electrode layer formed on one surface of the electrolytic membrane and a cathode catalyst electrode layer formed on the other surface of the electrolytic membrane. As a method of manufacturing the three-layer structure membrane-electrode assembly, a direct coating method and a decal method may be examples.

Among them, in the case of the decal method, an electrode film coated with each catalyst electrode layer is deposited on both surfaces of the electrolyte membrane, the catalyst electrode layer is transferred to both surfaces of the electrolyte membrane to be joined, and then the electrode film is removed, thereby manufacturing the membrane-electrode assembly of a three-layer structure.

That is, in the manufacturing process of the membrane-electrode assembly using the decal method, an electrode film of a roll type coated with each catalyst electrode layer and an electrolyte membrane of a roll type pass a bonding roll of high temperature and high pressure to be laminated (thermally compressed), and the electrode film is removed to manufacture the membrane-electrode assembly of the three-layer structure.

As described above, manufacturing the membrane-electrode assembly of the three-layer structure by the decal method using the roll laminating process may be advantageous in mass production because the manufacturing speed may be improved.

However, in the decal method using the roll lamination process, the electrode film coated with each catalyst electrode layer on both sides via the electrolyte membrane interposed therebetween passes between the bonding rolls of high temperature and high pressure, and the catalyst electrode layer and the electrolyte membrane are laminated in the directions such that they contact each other. We have discovered that it is difficult to align the lamination positions of the anode catalyst electrode layer and the cathode catalyst electrode layer.

That is, the electrode film and the electrolyte membrane continuously pass between the bonding rolls of high temperature and high pressure that are always pressed and the catalyst electrode layer is laminated on both surfaces of the electrolyte membrane. In roll laminating continuous process, we have discovered that it is difficult to correctly accord the lamination positions of the catalyst electrode layers due a feeding speed difference of the electrode film.

Also, we have discovered that the lamination positions of the anode catalyst electrode layer and the cathode catalyst electrode layer are difficult to align because a pitch between the catalyst electrode layers is not constant in the process of manufacturing the catalyst electrode layer of the continuous patterns by coating the catalyst slurry to the electrode film.

The above information disclosed in this Background section is only for enhancement of understanding of the background of the disclosure and therefore it may contain information that does not form the prior art that is already known to a person of ordinary skill in the art.

SUMMARY

The present disclosure provides an apparatus and a method for manufacturing a membrane-electrode assembly for a fuel cell, which can align the transfer positions of the anode and the cathode electrode layers on both sides of the electrolyte membrane in a simple configuration.

According to an exemplary form of the present disclosure, a manufacturing apparatus of a membrane-electrode assembly for a fuel cell, the manufacturing apparatus may include: an electrode film sheet unwinder configured to supply, along a predetermined transfer path, upper and lower electrode film sheets having upper and lower electrode films, wherein the upper and lower electrode films include anode and cathode layers applied continuously at predetermined intervals, an electrolyte membrane sheet unwinder that is configured to supply an electrolyte membrane sheet between the upper and lower electrode film sheets along the transfer path, a driving bonding roll that is driven rotatably in one direction on the transfer path and has an engraved portion and an embossing portion continuously formed on an exterior circumference surface, a driven bonding roll that is configured to be moved in the vertical direction toward the driving bonding roll and be in close contact with the driving bonding roll with the electrolyte membrane sheet and the upper and lower electrode film sheets interposed therebetween, and to rotate driven in the other direction, a film rewinder that is installed on the upper and lower sides of the transfer path from the rear of the driving bonding roll and driven bonding roll, and recovers by winding the upper and lower electrode films respectively, and a position aligning unit which is provided on the side of the electrode film sheet unwinder and the film rewinder, respectively, and aligns the positions of the anode layer and the cathode layer while switching the running direction of the upper and lower electrode film sheet and the upper and lower electrode film.

The manufacturing apparatus may further include a separation blade installed on the upper and lower sides of the transfer path from the film rewinder side, respectively, and separating the upper electrode film and the anode layer, and the lower electrode film and the cathode layer, respectively, and an electrode layer rewinder winding a membrane-electrode assembly, in which the anode and cathode layers are transferred, respectively, to the upper and lower surfaces of the electrolyte membrane sheet by the driving bonding roll and driven bonding roll at the end of the transfer path.

In another form of the present disclosure, a manufacturing apparatus of a membrane-electrode assembly for a fuel cell may include: an electrode film sheet unwinder for supplying upper and lower electrode film sheets having anode and cathode layers continuously applied to each of upper and lower electrode films at predetermined intervals along a predetermined transfer path, an electrolyte membrane sheet unwinder that supplies an electrolyte membrane sheet between the upper and lower electrode film sheets along the transfer path, a driving bonding roll that is driven rotatably in one direction by a first driver on the transfer path and has an engraved portion and an embossing portion continuously formed on an exterior circumference surface, a driven bonding roll that is installed to be movable in the vertical direction by a second driver toward the driving bonding roll and is in close contact with the driving bonding roll with the electrolyte membrane sheet and the upper and lower electrode film sheets interposed therebetween and rotates in the other direction, a film rewinder that is installed on the upper and lower sides of the transfer path from the rear of the driving bonding roll and driven bonding roll and recovers by winding the upper and lower electrode films respectively, a first turn roll set that is installed in the electrode film sheet supply path of the electrode film sheet unwinder side, and selectively switches the driving direction of the upper and lower electrode film sheets along the electrode film sheet supply path by a third and fourth driver, a second turn roll set that is installed in an electrode film recovery path of the film rewinder side, and selectively switches the driving direction of the upper and lower electrode films along the electrode film recovery path by a fifth and sixth driver, a first position sensor installed in front of the driving bonding roll and driven bonding roll and detecting edge positions of the anode and cathode layers, a second position sensor installed on the driving bonding roll side and detecting an edge position of the embossing portion, and a controller that analyzes the detection signal provided from the first and second position sensors and controls driving of the first to sixth driver according to the edge position of the embossing portion and the edge positions of the anode and cathode layer.

The manufacturing apparatus may further include a separation blade installed on the upper and lower sides of the transfer path from the film rewinder side, respectively, and separating the upper electrode film and the anode layer, and the lower electrode film and the cathode layer, respectively, an electrode layer rewinder winding a membrane-electrode assembly, in which the anode and cathode layers are transferred, respectively, to the upper and lower surfaces of the electrolyte membrane sheet by the driving bonding roll and driven bonding roll at the end of the transfer path, and a buffering portion provided between the separation blade and the electrode layer rewinder and compensating for a reverse running length of the electrolyte membrane sheet.

The first and second position sensor may include a vision sensor that simultaneously photographs the edge of the anode and cathode layer and the edge of the embossing portion, respectively, and outputs the vision data to the controller, and the first driver may include a servo motor, and the second driver may include a driving cylinder.

The first turn roll set may include a first driven roller provided freely rotatable and in contact with the upper and lower electrode film sheets running along the supply path, and a first driving roller that is installed to enable reciprocal movement in a direction moving away or closer to the first driven roller by the third driver, and rotatably installed in a direction opposite to the rotation direction of the first driven roller by the fourth driver.

The third driver may include a driving cylinder, and the fourth driver may include a servo motor.

The second turn roll set may include a second driven roller provided freely rotatable and in contact with the upper and lower electrode film running along the recovery path, and a second driving roller that is installed to enable reciprocal movement in a direction moving away from or toward the second driven roller by the fifth driver, and is rotatably installed in a direction opposite to the rotation direction of the second driven roller by the sixth driver.

The fifth driver may include a driving cylinder, and the sixth driver may include a servo motor.

The controller may include a signal processing unit that is configured to analyze the detection signal of the first position sensor and detect the edge position values of the anode and cathode layers and to be matched with the embossing portion, and the signal processing unit that is configured to analyze the detection signal of the second position sensor and detect the edge position value of the embossing portion to be matched with the edge position value of the anode and cathode layers, an operation unit that is configured to calculate the position difference between the edge position values of the anode and cathode layers and the edge position values of the embossing portion, and a signal application unit that is configured to apply a control signal to the first to six drivers according to the position difference value.

The buffering portion may include a pair of guide rollers configured to guide the transfer of the electrolyte membrane sheet in both directions along the transfer path, and a buffer roller that is configured to be moved in the vertical direction by a seventh driver between the guide rollers and to control the running length of the electrolyte membrane sheet.

A manufacturing method of a membrane-electrode assembly for a fuel cell using the apparatus for manufacturing a membrane-electrode assembly for a fuel cell, the manufacturing method according to an exemplary form of the present disclosure may include (a) supplying the electrolyte membrane sheet to the predetermined transfer path through the electrolyte membrane sheet unwinder, (b) supplying the upper and lower electrode film sheets applied with the anode and cathode layers to each of the upper and lower electrode films at predetermined intervals through the electrode film sheet unwinder to the upper and lower sides of the electrolyte membrane sheet along the transfer path, (c) passing the electrolyte membrane sheet and upper and lower electrode film sheet between the driving bonding roll and the driven bonding roll, and bonding the anode and cathode layers of the upper and lower electrode film sheets to the upper and lower surfaces of the electrolyte membrane sheet, respectively, (c) passing the electrolyte membrane sheet and upper and lower electrode film sheet between the driving bonding roll and the driven bonding roll, and bond the anode and cathode layers of the upper and lower electrode film sheets to the upper and lower surfaces of the electrolyte membrane sheet, respectively, (d) recovering the upper and lower electrode films of the upper and lower electrode film sheets from the rear side of the driving bonding roll and driven bonding roll through the film rewinder, respectively, (e) detecting the edge positions of the anode and cathode layers at the front side of the driving bonding roll and the driven bonding roll through the first position sensor, and detecting the edge position of the embossing portion of the driving bonding roll through the second position sensor, and (f) switching the upper and lower electrode film sheet running direction in the electrode film sheet unwinder and the upper and lower electrode film running direction in the film rewinder through first and second turn roll sets, respectively, according to the detection signal of the first and second position sensor, and aligning the transfer positions of the anode and cathode layers.

In the (a)-(d) process, the driven bonding roll may be raised, the driving bonding roll may be is driven and rotated, and the first driving roller of the first turn roll set may be separated from the first driven roller, and the second driving roller of the second turn roll set may be in close contact with the second driven roller, and the second driving roller may be driven along the direction of recovery of the upper and lower electrode films.

In the (a)-(d) process, the separation blade may separate the upper and lower electrode film and the anode and cathode layers of the upper and lower electrode film sheets, respectively, and with the buffer roller of the buffering portion lowered, the membrane-electrode assembly with the anode and cathode layers transferred to the upper and lower surfaces of the electrolyte membrane sheet may be transferred in a positive direction, and wound to the electrode layer rewinder.

In the (f) process, by analyzing the detection signal of the first position sensor by the controller, the edge position value of the anode and cathode layer to be matched with the edge position value of the embossing portion may be detected. By analyzing the detection signal of the second position sensor by the controller, the edge position value of the embossing portion to be matched with the edge of the anode and cathode layer may be detected, and the controller may calculate a position difference value between the edge position value of the anode and cathode layer and the edge position value of the embossing portion.

The (a)-(d) process may be performed when it is determined by the controller that the position difference value satisfies a predetermined reference value.

When it is determined by the controller that the position difference value does not satisfy a predetermined reference value, the (a)-(d) process may be performed as the electrode position alignment mode, the preceding anode and cathode layers may be bonded to the upper and lower surfaces of the electrolyte membrane sheet by the driving bonding roll and driven bonding roll. When an empty portion between the anode and cathode layers of the sensing target is positioned at the edge of the embossing portion of the driving bonding roll, transferring of the electrolyte membrane sheet may be stopped.

In the electrode position alignment mode, after stopping transfer of the electrolyte membrane sheet, the driven bonding roll may be lowered, the first driving roller of the first turn roll set may be separated from the first driven roller, the second driving roller of the second turn roll set may be in close contact with the second driven roller, and the second driving roller may be driven and rotated along the recovery direction of the upper and lower electrode films. The upper and lower electrode film sheets may be transferred in a positive direction along the transfer path by the electrode film sheet unwinder and film rewinder, and the anode and cathode layers as detection targets may be transferred to the separation blade, and the upper and lower electrode films may be separated from the anode and cathode layers bonded to the electrolyte membrane sheet by the separation blade.

In the electrode position alignment mode, after separation of the upper and lower electrode films, the first driving roller of the first turn roll set may be in close contact with the first driven roller, the first driving roller may be rotated in the supply opposite directions of the upper and lower electrode film sheets, and the upper and lower electrode film sheets may be driven in the supply opposite direction, the second driving roller of the second turn roll set may be separated from the second driven roller, and the upper and lower electrode films may be driven in opposite directions, and the buffer roller of the buffering portion may be moved in the upper direction, and the electrolyte membrane sheet with the anode and cathode layers transferred to the upper and lower surfaces may be transferred in the reverse direction.

In the electrode position alignment mode, the anode and cathode layers of the detection target may be positioned in front of the driving bonding roll and driven bonding roll, the anode and cathode layers bonded to the electrolyte membrane sheet may be positioned between the driving bonding roll and driven bonding roll, the anode and cathode layers of the detection target may be aligned in a predetermined matching position, the driving bonding roll may be driven and rotated in the reverse direction corresponding to the section of the empty portion, and the embossing portion may be aligned in a predetermined matching position, and the anode and cathode layers of the detection target and the positions of the embossing portion may be re-detected by the first and second position sensors, and the detection signal may be output to the controller.

An exemplary form of the present disclosure automatically aligns the transfer positions of the anode and cathode layers and manufactures a membrane-electrode assembly, so that the transfer uniformity of the anode and cathode layers can be improved, and quality of the membrane-electrode assembly can be improved.

In addition, the effect obtained or predicted by an exemplary form of the present disclosure will be disclosed directly or implicitly in the detailed description of an exemplary form of the present disclosure. That is, various effects predicted according to an exemplary form of the present disclosure will be disclosed within a detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
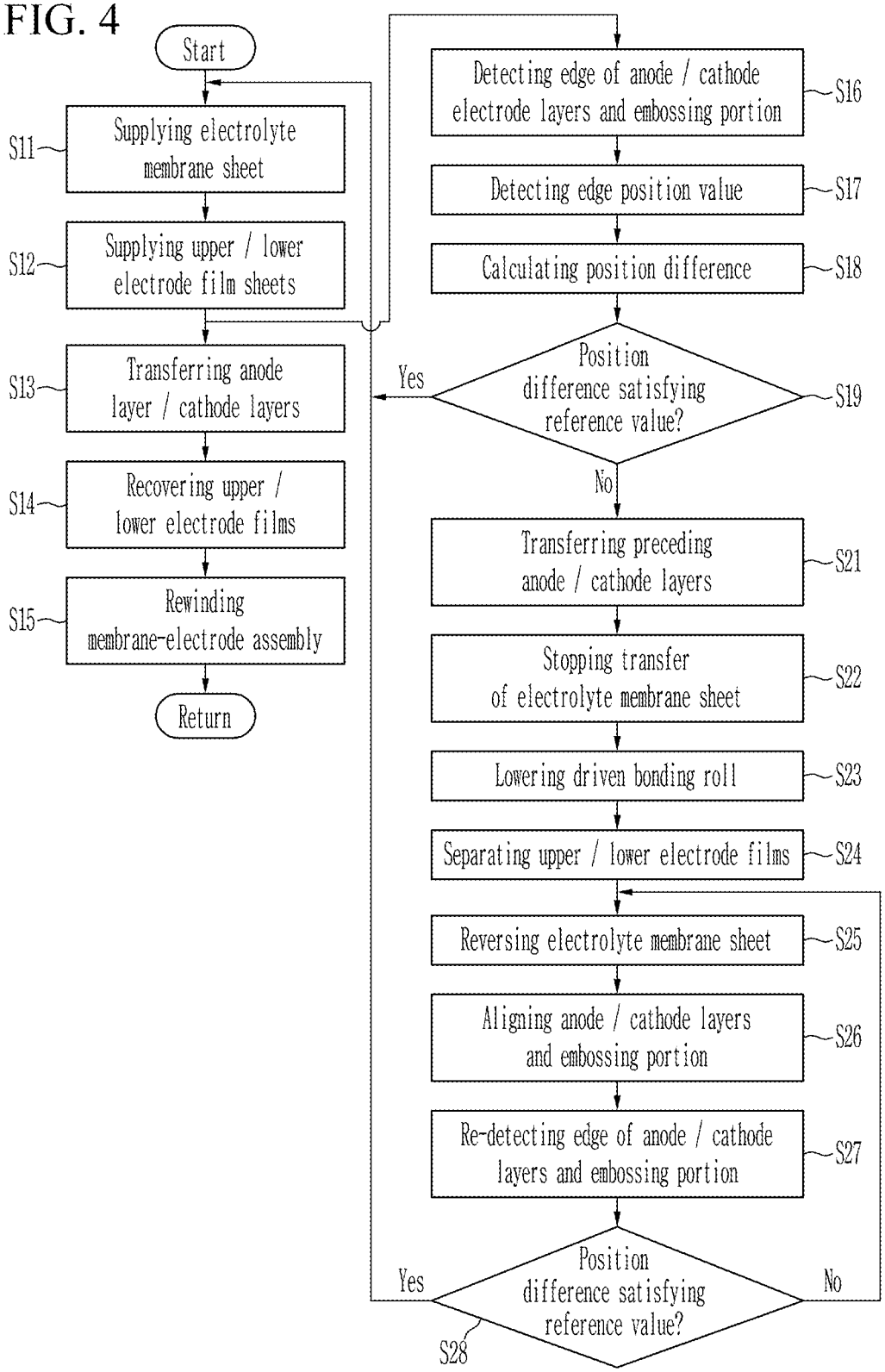

FIG. 4 is a flow-chart showing a method for a manufacturing a membrane-electrode assembly for a fuel cell according to an exemplary form of the present disclosure; and FIG. 5 to FIG. 10 are drawings showing operations of an apparatus for a manufacturing a membrane-electrode assembly and a manufacturing method using the apparatus for an apparatus for manufacturing a membrane-electrode assembly of a fuel cell according to an exemplary form of the present disclosure.

The drawings described herein are for illustration purposes only and are not intended to limit the scope of the present disclosure in any way.

DETAILED DESCRIPTION

The present disclosure will be described more fully hereinafter with reference to the accompanying drawings, in which exemplary forms of the disclosure are shown. As those skilled in the art would realize, the described forms may be modified in various different ways, all without departing from the spirit or scope of the present disclosure.

In order to clearly illustrate the present disclosure, parts not related to the description are omitted, and the same or similar components are denoted by the same reference numerals throughout the specification.

The sizes and thicknesses of the respective components shown in the drawings are arbitrarily shown for convenience of explanation. Therefore, the present disclosure is not necessarily limited to the drawings, and the thicknesses may be enlarged respectively.

In the following detailed description, the names of components are categorized into the first, second, and so on in order to distinguish the components from each other in the same relationship, and are not necessarily limited to the order in the following description.

In addition, unless explicitly described to the contrary, the word "comprise" and variations such as "comprises" or "comprising", will be understood to imply the inclusion of stated elements but not the exclusion of any other elements.

In addition, the terms "unit", "means", "portion", and "member" described in the specification indicate a unit of a comprehensive constituent element for performing at least one function or operation.

The term "close contact" described in the specification means that an element is moved toward another to perform transferring operation.

Figure 1:
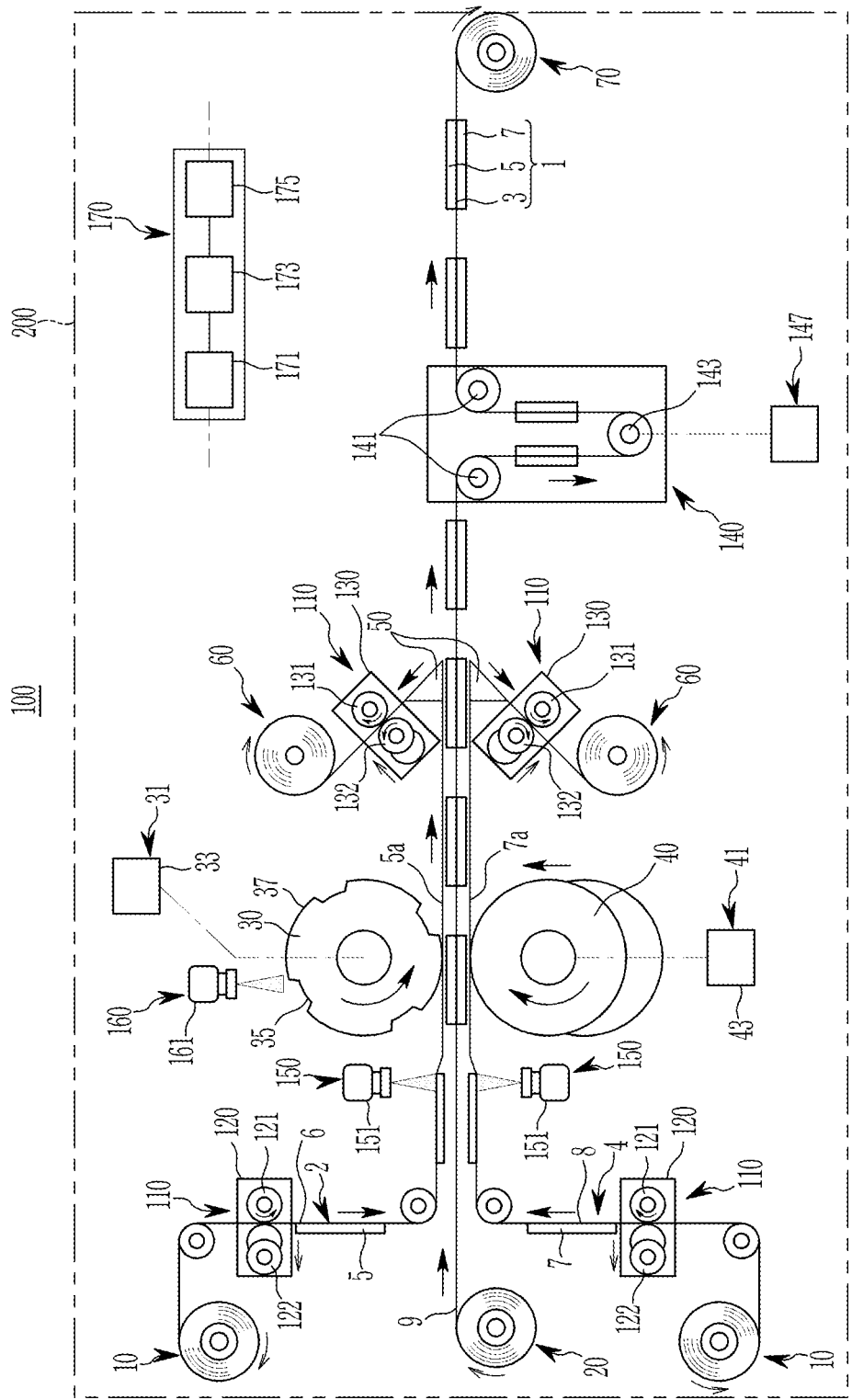
FIG. 1 is a drawing showing a manufacturing apparatus of a membrane-electrode assembly for a fuel cell according to an exemplary form of the present disclosure.

FIG. 1 is a drawing showing a manufacturing apparatus of a membrane-electrode assembly for a fuel cell according to an exemplary form of the present disclosure.

Referring to FIG. 1, an apparatus 100 for manufacturing a membrane-electrode assembly for a fuel cell can be applied to an automation system for automatically and continuously manufacturing parts of unit fuel cells constituting a fuel cell stack.

For example, the apparatus 100 may be applied to manufacture a membrane-electrode assembly 1 including an electrolyte membrane 3 in which an anode and a cathode electrode layer 5, 7 are bonded to both surfaces thereof.

The anode electrode layer 5 is bonded to an upper surface of an electrolyte membrane 3 and the cathode electrode layer 7 is bonded to the lower surface of the electrolyte membrane 3 at predetermined gap to manufacture the membrane electrode assembly 1.

Meanwhile, the apparatus 100 for manufacturing a membrane-electrode assembly for a fuel cell can automatically and continuously manufacture the membrane-electrode assembly 1 as a roll-to-roll system.

The roll-to-roll method refers to any process of applying coatings, printing, or performing other processes starting with a roll of a flexible material and re-reeling after the process to create an output roll.

The apparatus 100 of the roll-to-roll type has a structure in which the anode electrode layer 5 is transferred to the upper surface of the electrolyte membrane 3 and the cathode layer 7 is transferred to the lower surface of the electrolyte membrane 3 by the roll laminating method and the decal method and the membrane-electrode assembly 1 having a three-layer structure may be manufactured.

Also, the apparatus 100 includes a structure in which the membrane-electrode assembly 1 manufactured as described above is wound in a roll shape. And, although not shown in the drawing, as described above, the membrane-electrode assembly 1 wound in a roll shape is unwound, and the membrane-electrode assembly 1 is cut into a unit including anode and cathode layers 5, 7, and the membrane-electrode as a final fuel cell component assembly parts can be manufactured.

The apparatus 100 for manufacturing a membrane-electrode assembly for a fuel cell as described above includes an electrode film sheet unwinder 10, an electrolyte membrane sheet unwinder 20, a driving bonding roll 30, a driven bonding roll 40, a separation blade 50, a film rewinder 60, and an electrode layer rewinder 70.

Each of these components and other components to be described later may be configured in a main frame 200 of the roll-to-roll feeding facility. The main frame 200 supports each component, and may be composed of one frame or a frame divided into two or more frames.

The main frame 200 may include various additional components such as a bracket, a bar, a rod, a plate, a housing, a case, a block, and the like for supporting the components of the apparatus 100.

However, since the above-described various sub-elements are provided for installing the components of the present apparatus 100 to be described below in the main frame 200, and thus the frame 200 is referred to collectively.

Hereinafter, based on the mounting position of the constituent elements, the upper, upper end, upper surface and upper parts are defined as the upper part, and the lower, lower end, lower surface and the lower part is defined as the lower parts.

The electrode film sheet unwinder 10 is to supply a first electrode film sheet 2 wound in a roll form and a second electrode film sheet 4 wound in a roll form along a predetermined transfer path, respectively.

For better comprehension, the first electrode film sheet 2 mounted on the upper part is referred to as upper electrode film sheet 2, and the second electrode film sheet 4 is referred to as lower electrode film sheet 4. However, the mounting positions of the first electrode film sheet 2 and second electrode film sheet 4 are not limited thereto.

Based on the drawing, the anode layer 5 is applied at a predetermined interval on the lower surface of the upper electrode film 6 of the upper electrode film sheet 2. Based on the drawing, the cathode layer 7 is applied at a predetermined interval on the upper surface of the lower electrode film 8 of the lower electrode film sheet 4. The interval corresponding to the interval between the anode and cathode layers 5, 7 can be defined as empty portions 5a, 7a.

The electrode film sheet unwinder 10 is rotatably installed on the main frame 200 of the roll-to-roll feeding facility. This electrode film sheet unwinder 10 can supply the upper electrode films 6 and 8 along the transfer path.

The electrolyte membrane sheet unwinder 20 is to supply the electrolyte membrane sheet 9 wound in the form of a roll between the anode layer 5 of the upper electrode film sheet 2 and the cathode layer 7 of the lower electrode film sheet 4 along the transfer path.

The electrolyte membrane sheet unwinder 20 is rotatably installed on the main frame 200 of the roll-to-roll feeding facility.

The driving bonding roll 30 is rotatably installed in one direction (for example, the counterclockwise direction of drawing) through a first driver 31 on the upper side of the transfer path of the electrolyte membrane sheet 9 and upper electrode film sheets 2 and 4.

The driving bonding roll 30 is rotatably installed on the main frame 200 of the roll-to-roll feeding facility. The driving bonding roll 30 is not limited to rotating only in one direction, but may be rotated in both directions.

The first driver 31 applies a driving force to rotate the driving bonding roll 30, and is installed in the main frame 200 of the roll-to-roll feeding facility. For example, the first driver 31 may include a known technology servo motor 33 capable of servo control in a rotation direction and speed.

In the driving bonding roll 30, an engraved portion 35 and an embossing portion 37 are continuously formed along the exterior circumference on the exterior circumference surface. The engraved portion 35 is formed on the exterior circumference surface of the driving bonding roll 30 at predetermined intervals along the exterior circumference, and the embossed portion 37 is formed between the engraved portions 35.

The engraved portion 35 is formed in a section corresponding to the interval between the cathode layers 7 in the lower electrode film sheet 4, and the embossing portion 37 is formed in a section corresponding to the cathode layer 7.

That is, the engraved portion 35 is a portion that does not compress the anode layer 5 of the upper electrode film sheet 2 by the interval corresponding to the interval between the cathode layers 7. And the embossing portion 37 is a part that compresses the anode layer 5 of the upper electrode film sheet 2 by a section corresponding to the cathode layer 7.

The driven bonding roll 40 is installed to enable reciprocal movement in the vertical direction through a second driver 41 from the lower side of the driving bonding roll 30. The driven bonding roll 40 is installed on the main frame 200 of the roll-to-roll feeding facility to enable reciprocal movement in the vertical direction.

The driven bonding roll 40 is in close contact with the driving bonding roll 30 with the electrolyte membrane sheet 9 and the upper and lower electrode film sheets 2 and 4 interposed therebetween, and may be driven in another direction (eg, clockwise based on drawing) by driving rotation of the driving bonding roll 30. The driven bonding roll 40 is installed rotatably on the main frame 200 of the roll-to-roll feeding facility.

The second driver 41 applies a driving force to the driven bonding roll 40 so that the driven bonding roll 40 reciprocates in the vertical direction, and is installed on the main frame 200 of the roll-to-roll feeding facility.

For example, the second driver 41 may include a driving cylinder 43 of a known technology that provides a driving bonding roll 40 with an operation force in the vertical direction. The driving cylinder 43 operates backwards and forwards along the vertical direction with a predetermined stroke, and reciprocates the driven bonding roll 40 in the vertical direction.

The electrolyte membrane sheet 9 and the upper and lower electrode film sheets 2 and 4 are passed between the driving bonding roll 30 and the driven bonding roll 40 and pressed, the anode layer 5 of the upper electrode film 6 and the cathode layer 7 of the lower electrode film 8 can be transferred to the upper and lower surfaces of the electrolyte membrane sheet 9 by roll lamination and decal method.

At the rear side of the driving bonding roll 30 and driven bonding roll 40, the separation blade 50 separates the anode layer 5 from the upper electrode film 6 of the upper electrode film sheet 2, and separates the cathode layer 7 from the lower electrode film 8 of the lower electrode film sheet 4.

The separation blade 50 is provided as a delamination blade, and is installed on the upper and lower sides of the transfer path at the rear side of the driving bonding roll 30 and the driven bonding roll 40, respectively.

The film rewinder 60 is installed on the rear side of the driving bonding roll 30 and driven bonding roll 40 to recover the upper electrode film 6 and lower electrode film 8 separated by the separation blade 50.

The film rewinder 60 is installed on the upper and lower sides of the transfer path from the separation blade 50 to recover and wind the upper electrode film 6 and the lower electrode film 8. The film rewinder 60 is rotatably installed on the main frame 200 of the roll-to-roll feeding facility.

The anode layer 5 and the cathode layer 7 are transferred to the upper and lower surfaces of electrolyte membrane sheet 9 by the driving bonding roll 30 and the driven bonding roll 40, respectively, to form the membrane-electrode assembly 1, and the membrane-electrode assembly 1 is recovered at the end of the transfer path. The electrode layer rewinder 70, which recovers the membrane-electrode assembly 1, is rotatably installed on the main frame 200 of the roll-to-roll feeding facility.

According to the apparatus 100 for manufacturing a membrane-electrode assembly for a fuel cell described above, the electrolyte membrane sheet 9 is supplied to the predetermined transfer path through the electrolyte membrane sheet unwinder 20.

The upper electrode film sheet 2 and the lower electrode film sheet 4 wound in roll form are supplied through the electrode film sheet unwinder 10, respectively, and are supplied through the transfer path with the electrolyte membrane sheet 9 interposed therebetween.

Here, the upper electrode film sheet 2 is positioned on the upper side of the electrolyte as being positioned on the lower side of the electrolyte membrane sheet 9, but is not limited thereto. That is, the opposite configuration is also possible. The anode layer 5 is continuously applied at predetermined intervals on the lower surface of the upper electrode film 6 of the upper electrode film sheet 2, and the cathode layer 7 is continuously applied at predetermined intervals on the upper surface of the lower electrode film 8 of lower electrode film sheet 4.

In this process, the driving bonding roll 30 is rotated by the first driver 31 at a predetermined rotation speed along the counterclockwise direction, and the driven bonding roll 40 is moved in the upward direction by the second driver 41.

In this state, the upper electrode film sheet 2 and the lower electrode film sheet 4 with the electrolyte membrane sheet 9 interposed therebetween enter between the driving bonding roll 30 and the driven bonding roll 40.

Then, as the driving bonding roll 30 rotates in a counterclockwise direction, the driven bonding roll 40 is rotated passively and is in close contact with the driving bonding roll 30 with interposing the electrolyte membrane sheet 9 and the upper and lower electrode film sheets 2, 4 therebetween.

Therefore, while the driving bonding roll 30 and driven bonding roll 40 press the electrolyte membrane sheet 9 and the upper and lower electrode film sheets 2, 4, the anode layer 5 of the upper electrode film sheet 2 is attached to the upper surface of the electrolyte membrane sheet 9, and the cathode layer 7 of lower electrode film sheet 4 is attached to the lower surface of electrolyte membrane sheet 9.

Through the driving bonding roll 30 and driven bonding roll 40, the anode layer 5 of the upper electrode film sheet 2 and the cathode layer 7 of the lower electrode film sheet 4 are transferred to the upper and lower surfaces of the electrolyte membrane sheet 9 by roll lamination and decal method, respectively. Thus, the anode electrode layer 5 and the cathode electrode layer 7 are bonded to the upper and lower surfaces of the electrolyte membrane fabric 9, respectively.

The engraved portion 35 of the driving bonding roll 30 does not compress the anode layer 5 of the upper electrode film sheet 2 by the interval corresponding to the interval between the cathode layer 7, and the embossing portion 37 compresses the anode layer 5 of the upper electrode film sheet 2 by a section corresponding to the cathode layer 7 and transfers it to the upper surface of the electrolyte membrane sheet 9.

In this state, the upper and lower electrode film 6 and lower electrode film 8 are separated from the upper and lower electrode film sheets 2, 4 through the separation blade 50 at the rear side of the driving bonding roll 30 and driven bonding roll 40, respectively. The upper electrode film 6 and lower electrode film 8 separated as described above are recovered by winding the film rewinder 60 through the recovery path.

And, the membrane-electrode assembly 1 formed by bonding the anode layer 5 and the cathode layer 7 to the upper and lower surfaces of the electrolyte membrane sheet 9 by the driving bonding roll 30 and driven bonding roll 40, respectively, is wound around the electrode layer rewinder 70 at the end of the transfer path.

Meanwhile, the apparatus 100 for manufacturing a membrane-electrode assembly for a fuel cell may have difficulty in accurately matching the transfer positions of the anode and cathode layers 5, 7 with respect to the electrolyte membrane sheet 9 due to the difference in feeding speed between the upper and lower electrode film sheets 2, 4 transferred along the transfer path, and pitch (interval) distribution between the anode and cathode layers 5, 7 applied to upper and lower electrode films 6, 8 of the upper and lower electrode film sheets 2, 4

In an exemplary form of the present disclosure, an apparatus 100 for manufacturing a membrane-electrode assembly for fuel cells capable of automatically aligning the transfer positions of the anode and cathode layers 5, 7 on the upper and lower surfaces of the electrolyte membrane sheet 9 with a simple configuration is provided.

The fuel cell membrane-electrode assembly manufacturing apparatus 100 further includes a position aligning unit 110, a buffering portion 140, a first position sensor 150, a second position sensor 160, and a controller 170.

The position aligning unit 110 can align the positions of the anode layer 5 and cathode layer 7 while switching the driving directions of the upper and lower electrode film sheets 2, 4 and the upper and lower electrode films 6, 8. The position aligning unit 110 is provided near the electrode film sheet unwinder 10 and the film rewinder 60, respectively.

Hereinafter, when the positions of the anode and cathode layers 5, 7 to be bonded to the electrolyte membrane sheet 9 are aligned (matched) with each other, it is referred to as matching, and the state in which they are not aligned with each other is referred to as mismatch.

That is, the position aligning unit 110 is a configuration for correcting (aligning) the positions of the anode layer 5 and cathode layer 7 to the matching position when the positions of anode layer 5 and cathode layer 7 in upper and lower electrode film sheets 2 and 4 transferred along the transfer path are mismatched positions.

This position aligning unit 110 includes a first turn roll set 120 and a second turn roll set 130.

The first turn roll set 120 is installed on the supply path to supply upper and lower electrode film sheets 2, 4 to the transfer path from the electrode film sheet unwinder 10.

Figure 2:
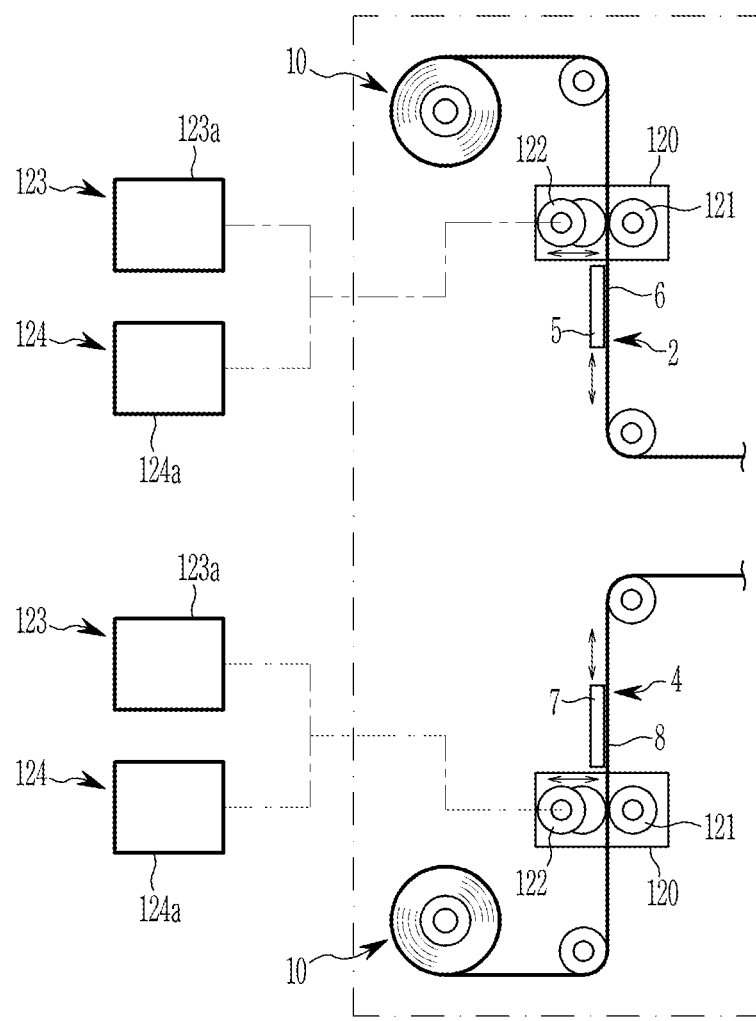
FIG. 2 is a drawing showing a first turn roll set applied to an apparatus for manufacturing a membrane-electrode assembly for a fuel cell according to an exemplary form of the present disclosure.

FIG. 2 is a drawing showing a first turn roll set applied to an apparatus for manufacturing a membrane-electrode assembly for a fuel cell according to an exemplary form of the present disclosure.

Referring to FIG. 1 and FIG. 2, the first turn roll set 120 can selectively switch the driving directions of the upper and lower electrode film sheets 2, 4 along the supply path by third and fourth drivers 123, 124.

The first turn roll set 120 includes first driven roller 121 and first driving roller 122. The first driven roller 121 and first driving roller 122 are rotatably installed on the main frame 200 of the roll-to-roll feeding facility. The first driven roller 121 contacts the upper and lower electrode film sheets 2, 4 running along the supply path and is freely (passive) rotatable.

The first driving roller 122 is provided to enable a reciprocal movement in a direction moving away or toward the first driven roller 121 by the third driver 123. The first driving roller 122 is provided to rotate by the fourth driver 124 in a direction opposite to the rotation direction of the first driven roller 121. And, the first driving roller 122 is provided to rotate to drive in opposite directions of supply of upper and lower electrode film sheets 2, 4 by the fourth driver 124.

The first driving roller 122 can be moved in a direction away from the first driven roller 121 through the third driver 123. In this case, the first driving roller 122 does not provide driving force through the fourth driver 124, and the first driven roller 121 contacts the upper and lower electrode film sheets 2, 4, and rotates along the moving direction of the upper and lower electrode film sheets 2, 4.

In addition, the first driving roller 122 may be moved in a direction closer to the first driven roller 121 through the third driver 123. In this case, the first driving roller 122 receives driving force through the fourth driver 124 and rotates. This first driving roller 122 is in close contact with the first driven roller 121 and rotates in the opposite direction to the first driven roller 121 (supply opposite directions of upper and lower electrode film sheets 2 and 4) and then, the first driving roller 122 can reverse drive the upper and lower electrode film sheets 2, 4 in opposite directions of the supply of the upper and lower electrode film sheets 2, 4.

The third driver 123 may include a known technology driving cylinder 123a which is connected to the first driving roller 122, and supplies power to the first driving roller 122 to be moved forward and backward with respect to the first driven roller 121. In addition, the fourth driver 124 may include a known technology servo motor 124a capable of servo control of a rotation direction and speed.

Figure 3:
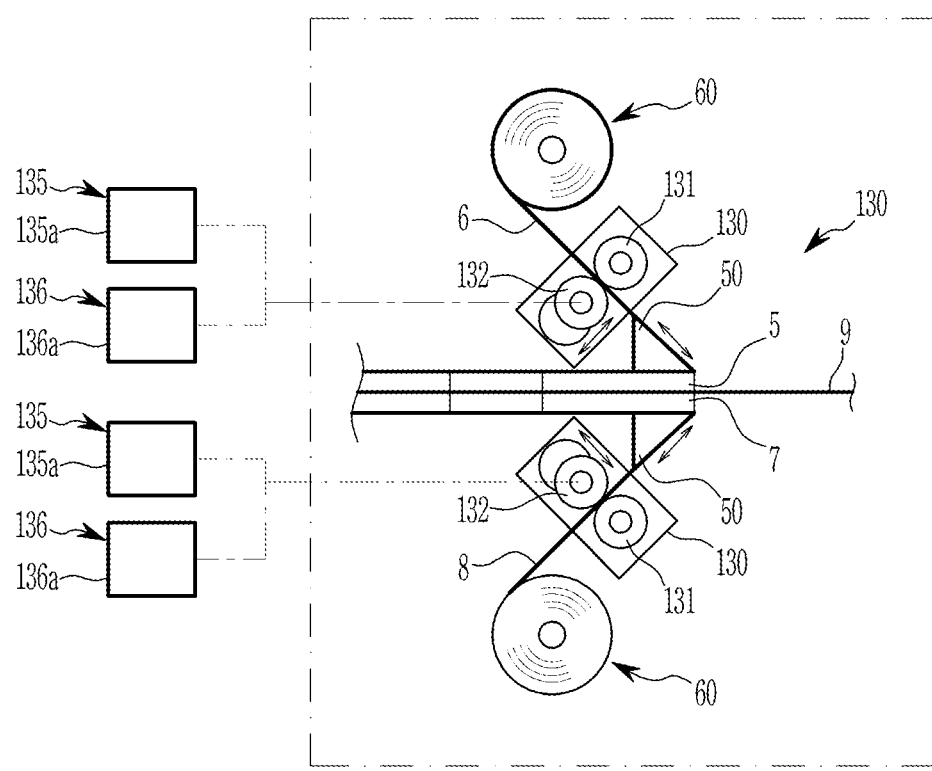
FIG. 3 is a drawing showing a second turn roll set applied to an apparatus for manufacturing a membrane-electrode assembly for a fuel cell according to an exemplary form of the present disclosure.

FIG. 3 is a drawing showing a second turn roll set applied to an apparatus for manufacturing a membrane-electrode assembly for a fuel cell according to an exemplary form of the present disclosure.

Referring to FIG. 3, the second turn roll set 130 is installed in the recovery path to recover the upper and lower electrode films 6, 8 separated from the upper and lower electrode film sheets 2 and 4 by the separation blade 50 on the film rewinder 60 side.

The second turn roll set 130 can selectively switch the driving directions of the upper and lower electrode films 6, 8 along the recovery path by fifth and sixth drivers 135, 136.

This second turn roll set 130 includes a second driven roller 131 and a second driving roller 132. The second driven roller 131 and second driving roller 132 are rotatably installed on the main frame 200 of the roll-to-roll feeding facility. The second driven roller 131 contacts the upper and lower electrode films 6 and 8 running along the recovery path and is freely (passive) rotatable.

The second driving roller 132 is provided to enable reciprocal movement in a direction moving away from or toward the second driven roller 131 by the fifth driver 135. The second driving roller 132 is provided rotatable by the sixth driver 136 in a direction opposite to the rotation direction of the second driven roller 131. That is, the second driving roller 132 is provided to rotate by the recovery direction of the upper and lower electrode films 6 and 8 by the sixth driver 136.

The second driving roller 132 may be moved in a direction closer to the second driven roller 131 by the fifth driver 135. In this case, the second driving roller 132 receives driving force through the sixth driver 136 and rotates. This second driving roller 132 is in close contact with the second driven roller 131 and rotates in opposite directions (recovery directions of upper and lower electrode films 6, 8) with the second driven roller 131 to recover the upper and lower electrode films 6, 8.

And, the second driving roller 132 may be moved in a direction away from the second driven roller 131 by the fifth driver 135. In this case, the second driving roller 132 does not receive driving power through the sixth driver 136, and the second driven roller 131 contacts the upper and lower electrode films 6 and 8 running in the opposite direction of recovery, and can be rotated passively in opposite directions of the recovery of upper and lower electrode films 6, 8.

The fifth driver 135 may include a known technology driving cylinder 135a which is connected to the second driving roller 132, and supplies power to the second driving roller 132 to be moved forward and backward with respect to the second driven roller 131. In addition, the sixth driver 136 may include a known technology servo motor 136a capable of servo control of a rotation direction and speed.

Referring to FIG. 1, the buffering portion 140 is to compensate for the reverse running length of the electrolyte membrane sheet 9. The buffering portion 140 is to inhibit unwinding of the electrode layer rewinder 70 when the electrolyte membrane sheet 9 runs backward along the transfer path.

The buffering portion 140 is provided between the separation blade 50 and the electrode layer rewinder 70 on the transfer path. The buffering portion 140 includes a guide roller 141 and a buffer roller 143.

The guide rollers 141 may be installed rotatably in pairs on the transfer path. The guide rollers 141 guide the transfer of the electrolyte membrane sheet 9 in both directions along the transfer path. The guide roller 141 is in contact with the electrolyte membrane sheet 9 and can be rotated by the tension of the electrolyte membrane sheet 9.

The buffer roller 143 is to adjust the running length of the electrolyte membrane sheet 9, and is installed to be movable in the vertical direction by a seventh driver 147 between the guide rollers 141. The buffer roller 143 is in contact with the electrolyte membrane sheet 9 and can be rotated by the tension of the electrolyte membrane sheet 9.

The seventh driver 147 is connected to the buffer roller 143 and may include a driving cylinder of a known technology that provides the buffer roller 143 with an operation force in the vertical direction.

The first position sensor 150 is installed in the main frame 200 of the roll-to-roll feeding facility from the front side of the driving bonding roll 30 and driven bonding roll 40. The first position sensor 150 is installed on the upper and lower sides of the driving bonding roll 30 and the driven bonding roll 40 respectively with the transfer path between them.

The first position sensor 150 detects edge positions of the anode and cathode layers 5 and 7 of the upper and lower electrode film sheets 2, 4 supplied along the transfer path through the electrode film sheet unwinder 10, respectively, and the detected signal is output to the controller 170.

For example, the first position sensor 150 includes a known technology vision sensor 151 that photographs the edges of the anode and cathode layers 5, 7 and outputs the vision data to the controller 170.

The second position sensor 160 is installed in the main frame 200 of the roll-to-roll feeding facility from the front side of the driving bonding roll 30. The second position sensor 160 detects the edge position of the embossing portion 37 of the driving bonding roll 30 and outputs the detection signal to the controller 170.

For example, the second position sensor 160 includes a known technology vision sensor 161 that photographs the edge of the embossing portion 37 and outputs the vision data to the controller 170.

The first and second position sensors 150, 160 may simultaneously photograph the edges of the anode and cathode layers 5, 7 and the edges of the embossing portion 37, respectively, and the operation of the vision photographing may be controlled through the controller 170.

On the first position sensor 150 side, a color sensor that detects colors of the anode and cathode layers 5, 7 and the empty portions 5a, 7a mentioned above and outputs the detection signal to the controller 170 may be installed.

The controller 170 is a controller that controls the overall operation of the device 100, and may be implemented as at least one control processor operated by a predetermined program, and it may include a series of commands for performing content according to an exemplary form of the present disclosure.

The controller 170 may analyze the detection signal provided from the first and second position sensors 150, 160, and may control driving of the first to seventh drivers 31, 41, 123, 124, 135, 136, and 147 according to the edge position of the embossing portion 37 and the edge positions of the anode and cathode layers 5, 7.

The controller 170 may include a signal processing unit 171, an operation unit 173 and a signal application unit 175.

The signal processing unit 171 analyzes the detection signal of the first position sensor 150 and detects the edge position values of the anode and cathode layers 5, 7 to be matched with the embossing portion 37. And the signal processing unit 171 analyzes the detection signal of the second position sensor 160 and detects the edge position value of the embossing portion 37 to be matched with the edges of the anode and cathode layers 5, 7.

The operation unit 173 calculates the position difference between the edge position values of the anode and cathode layers 5, 7 and the edge position values of the embossing portion 37. The signal application unit 175 may apply a control signal to the first to seventh drivers (31, 41, 123, 124, 135, 136, 147) according to the position difference value.

Hereinafter, operation of the manufacturing apparatus 100 for a membrane-electrode assembly for a fuel cell according to an exemplary form of the present disclosure configured as described above and a manufacturing method of a membrane-electrode assembly for a fuel cell using the manufacturing apparatus 100 are described with reference to accompanying drawings.

FIG. 4 is a flow-chart showing a method for a manufacturing a membrane-electrode assembly for a fuel cell according to an exemplary form of the present disclosure, and FIG. 5 to FIG. 10 are drawings showing operations of an apparatus for a manufacturing a membrane-electrode assembly and a manufacturing method using the apparatus for an apparatus for manufacturing a membrane-electrode assembly of a fuel cell according to an exemplary form of the present disclosure.

Figure 5:
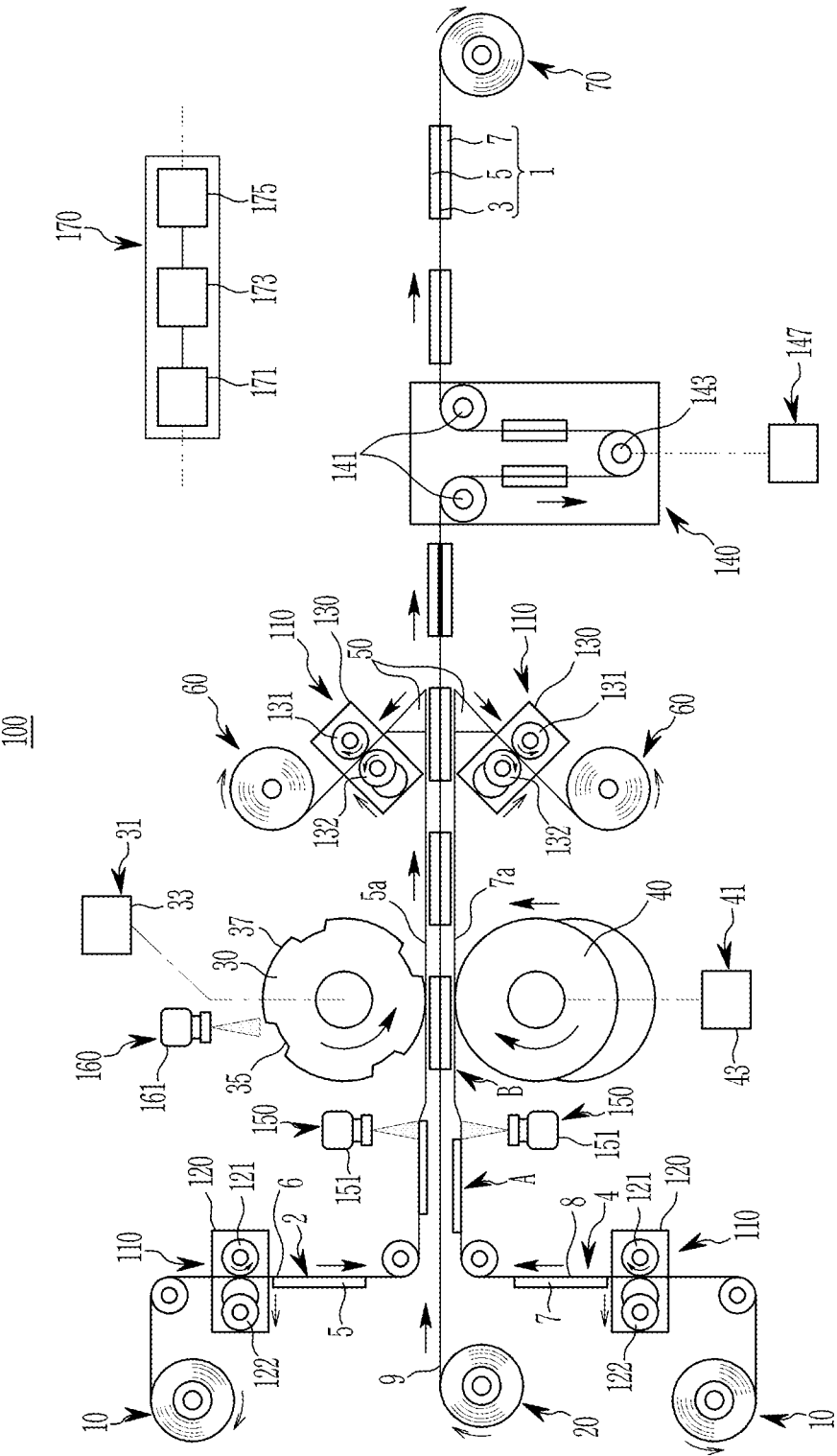

Referring to FIG. 1, FIG. 4 and FIG. 5, the electrolyte membrane sheet 9 wound in a roll form is supplied to the predetermined transfer path through the electrolyte membrane sheet unwinder 20 at step S11.

At the same time, the upper and lower electrode film sheets 2 and 4, in which the anode and cathode layers 5, 7 are continuously applied to each of the upper and lower electrode films 6, 8 at predetermined intervals, are respectively supplied to the upper and lower sides of electrolyte membrane sheet 9 along the transfer path through the electrode film sheet unwinder 10 at step S12.

Here, the driven bonding roll 40 is in a state of being raised by the second driver 41, and the driving bonding roll 30 is in a state of being driven and rotated by the first driver 31. The driving bonding roll 30 and the driven bonding roll 40 are rotated in opposite directions along transfer path, and the driven bonding roll 40 is rotated passively by the driving bonding roll 30.

The first driving roller 122 of the first turn roll set 120 is separated from the first driven roller 121 by the third driver 123. And the second driving roller 132 of the second turn roll set 130 is in close contact with the second driven roller 131 by the fifth driver 135, and is rotated along the recovery direction of the upper and lower electrode films 6, 8 by the sixth driver 136. The buffer roller 143 of the buffering portion 140 is moved downward by the seventh driver 147.

In this state, the electrolyte membrane sheet 9 and the upper and lower electrode film sheets 2, 4 are supplied between the driving bonding roll 30 and the driven bonding roll 40, and the anode layer 5 and the cathode layer 7 of the upper and lower electrode film sheets 2, 4 are transferred to the upper and lower surfaces of the electrolyte membrane sheet 9, respectively at step S13.

Then, the upper and lower electrode films 6 and 8 are separated from the upper and lower electrode film sheets 2, 4 by the separation blade 50 at the rear side of the driving bonding roll 30 and driven bonding roll 40, respectively.

Next, the upper and lower electrode films 6 and 8 separated by the separation blade 50 are driven to the recovery direction along the recovery path by the film rewinder 60 and are recovered at step S14.

At this time, since the first driving roller 122 of the first turn roll set 120 is separated from the first driven roller 121, the upper and lower electrode film sheets 2 and 4 travel along the supply path through the first driven roller 121. And, the second driving roller 132 of the second turn roll set 130 is in close contact with the second driven roller 131 and rotates along the recovery direction of the upper and lower electrode films 6, 8. Therefore, the upper and lower electrode films 6 and 8 pass between the second driven roller 131 and the second driving roller 132 rotating in opposite directions, and are wound around the film rewinder 60 and recovered.

Since the processes of S11, S12, S13, and S14 have already been described in the operation of the membrane-electrode assembly manufacturing apparatus 100 for a fuel cell, a more detailed description will be omitted.

Meanwhile, with the upper and lower electrode films 6, 8 separated, the membrane-electrode assembly 1 in which the anode and cathode layers 5, 7 are transferred to the upper and lower surfaces of the electrolyte membrane sheet 9 is transferred along the transfer path. And the membrane-electrode assembly 1 is wound around the electrode layer rewinder 70 at step S15.

In this process, the membrane-electrode assembly 1 is transferred in the positive direction through the guide roller 141 and the buffer roller 143 of the buffering portion 140, and the membrane-electrode assembly 1 can be wound through the electrode layer rewinder 70.

Here, since the buffer roller 143 of the buffering portion 140 is moved downward by the seventh driver 147, the running length (or buffer length) of the electrolyte membrane sheet 9 is increased, and the electrolyte membrane sheet 9 is transferred to the electrode layer rewinder 70 via the guide roller 141.

On the other hand, while going through the process as described above, the first position sensor 150 in front of the driving bonding roll 30 and the driven bonding roll 40 detects the edge positions of the anode and cathode layers 5, 7 as detection targets to enter between the driving bonding roll 30 and the driven bonding roll 40, and outputs the detection signal to the controller 170. Then, in the driving bonding roll 30, the edge position of the embossing portion 37 of the driving bonding roll 30 is detected by the second position sensor 160, and the detection signal is output to the controller 170 at step S16.

Here, the first and second position sensors 150, 160 simultaneously photograph the edges of the anode and cathode electrode layers 5, 7 and the edges of the embossed portion 37 and transmit the vision data to the controller 170.

The signal processing unit 171 of the controller 170 analyzes the detection signal of the first position sensor 150 and detects the edge position values of the anode and cathode layers 5, 7 to match the edge of the embossing portion 37. And the signal processing unit 171 of the controller 170 analyzes the detection signal of the second position sensor 160 to detect the edge position value of the embossing portion 37 to be matched with the edges of the anode and cathode layers 5, 7 at step S17.

In addition, the operation unit 173 of the controller 170 calculates a position difference value between the edge position values of the anode and cathode layers 5, 7 and the edge position values of the embossing portion 37 at step S18. Then, the controller 170 determines whether the position difference between the edge position values of the anode and cathode layers 5, 7 and the edge position values of the embossing portion 37 satisfy a predetermined reference value at step S19.

Whether the position difference between the edge position values of the anode and cathode layers 5, 7 and the edge position value of the embossing portion 37 satisfies a predetermined reference value depends on whether the position difference is within the allowable error range.

If it is determined that the position difference value satisfies the reference value in the process S19, a series of processes S11 to S15 as described above are performed.

However, in the step S19, if it is determined that the position difference value does not satisfy a predetermined reference value, the electrode position alignment mode is performed.

Figure 6:
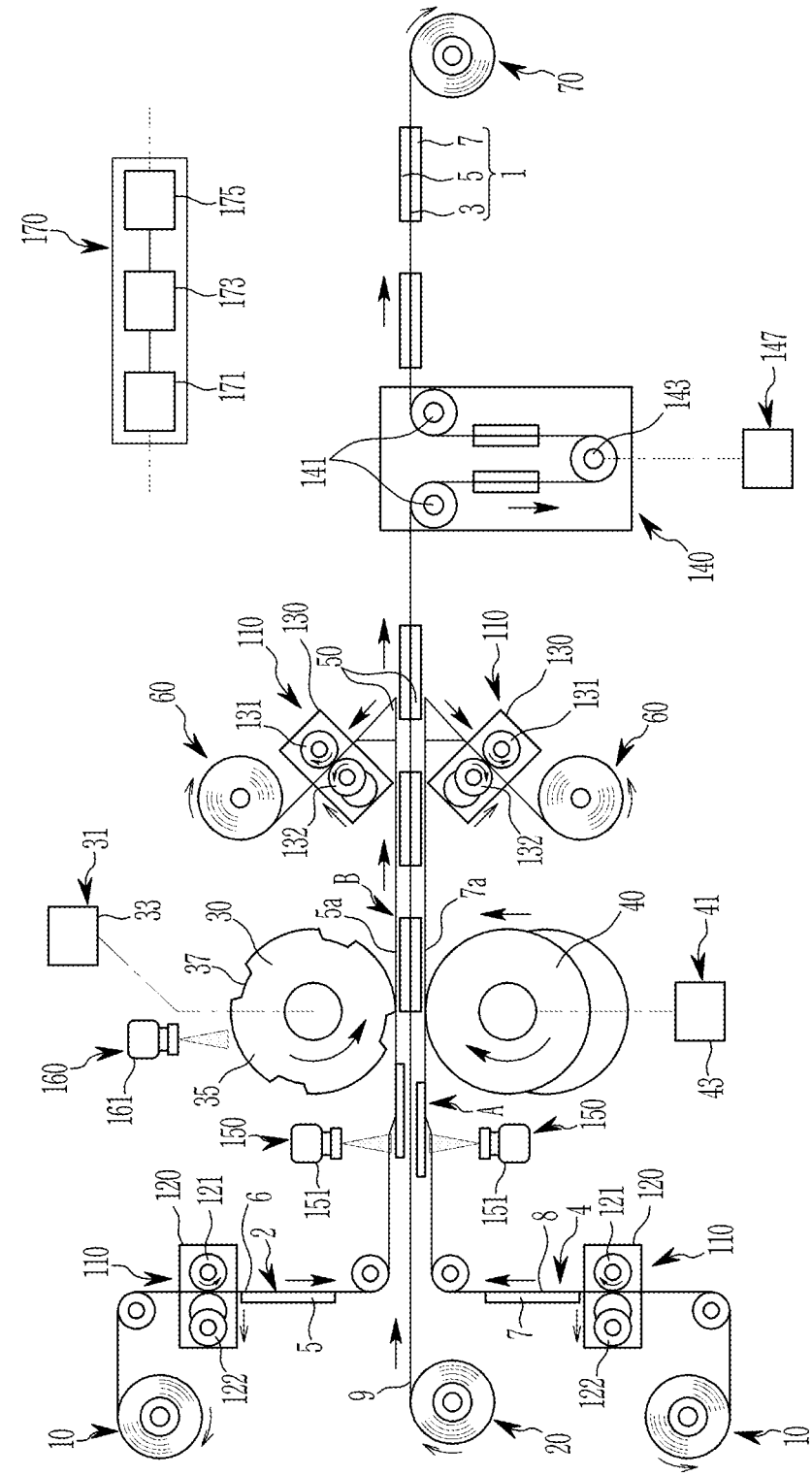

In this course, as shown in FIG. 6, the preceding other anode and cathode layers 5, 7 (B) of the anode and cathode layers 5, 7 (A) to be detected are subjected to the processes of S11-S15. That is, the other preceding anode and cathode layers 5, 7 (B) are bonded (transferred) to the upper and lower surfaces of the electrolyte membrane sheet 9 through the driving bonding roll 30 and driven bonding roll 40 at step S21.

When the electrode position alignment mode is performed, the transfer of the electrolyte membrane sheet 9 is stopped at the moment that the empty portions 5a, 7a between the anode and cathode layers 5, 7 (A) to be detected are positioned at the edge of the embossing portion 37 of the driving bonding roll 30.

Figure 7:
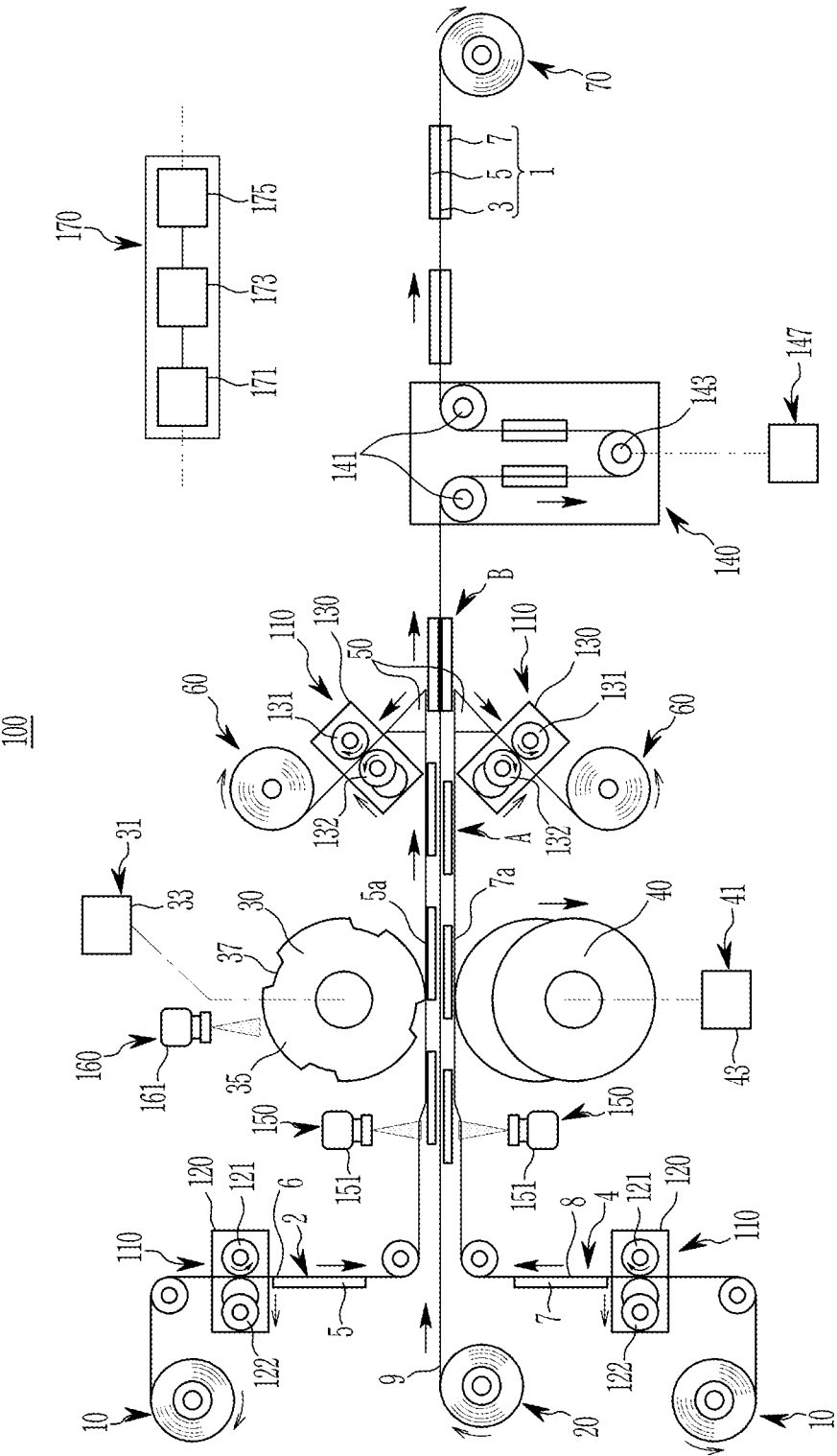

After that, as shown in FIG. 7, the first driver 31 stops driving the driving bonding roll 30, and the second driver 41 lowers the driven bonding roll 40 at step S23.

Next, the third driver 123 separates the first driving roller 122 of the first turn roll set 120 from the first driven roller 121, and the fifth driver 135 attaches the second driving roller 132 of the second turn roll set 130 to the second driven roller 131, and the sixth driver 136 maintains a state in which the second driving roller 132 is driven and rotated with the recovery direction of the upper and lower electrode films 6, 8.

Accordingly, the upper and lower electrode film sheets 2, 4 are transferred in a positive direction along the transfer path through the electrode film sheet unwinder 10 and film rewinder 60, and the anode and cathode layers 5, 7 (A) of the detection target are transferred toward the separation blade 50. At this time, the upper and lower electrode film sheets 2, 4 are driven in the transfer path through the first driven roller 121.

After that, the upper and lower electrode films 6, 8 are separated from the anode and cathode layers 5, 7 bonded to the electrolyte membrane sheet 9 through the separation blade 50 at step S24.

The separated upper and lower electrode films 6, 8 are individually correctable by the first turn roll set 120 and the second turn roll set 130.

The upper and lower electrode films 6, 8 separated as above pass between the second driven roller 131 and the second driving roller 132 rotating in opposite directions, are wound around the film rewinder 60 while driving along the recovery direction.

Figure 8:
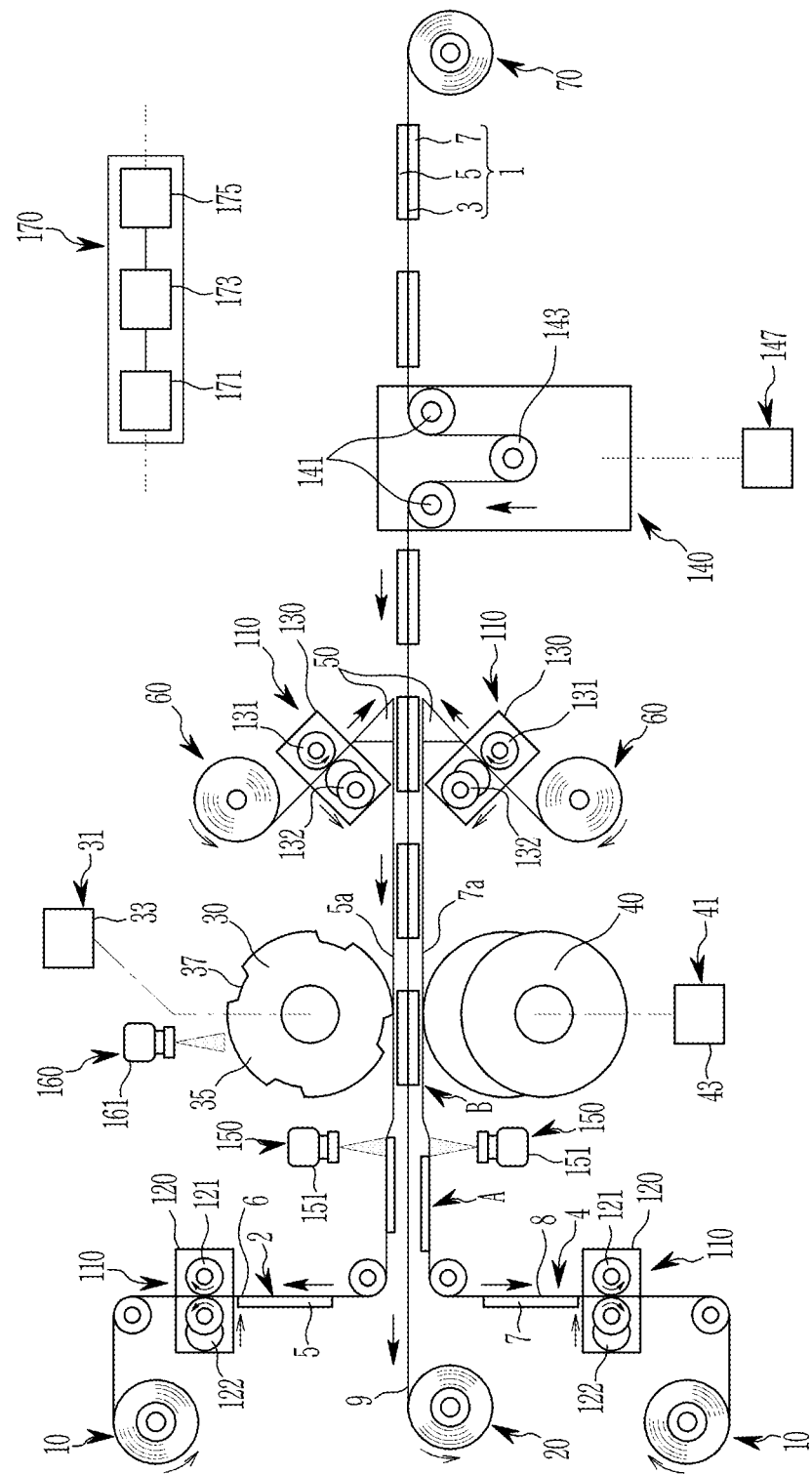

After going through this process, as shown in FIG. 8, the third driver 123 makes the first driving roller 122 of the first turn roll set 120 in close contact with the first driven roller 121, and the fourth driver 124 rotates the first driving roller 122 in the opposite directions of the supply of the upper and lower electrode film sheets 2, 4. Then, the first driven roller 121 and the first driving roller 122 rotate in opposite directions, drive the upper and lower electrode film sheets 2, 4 reversely.

At the same time, the second driving roller 132 of the second turn roll set 130 is separated from the second driven roller 131 by the fifth driver 135. Then, the upper and lower electrode films 6, 8 wound around the film rewinder 60 are released, and the upper and lower electrode films 6, 8 are reversely driven along the recovery path by the second driven roller 131 at step S25.

In the above process, the buffer roller 143 is moved in the upper direction by the seventh driver 147 of the buffering portion 140, and the electrolyte membrane sheet 9 with the anode and cathode layers 5, 7 transferred on the top and bottom surfaces is transferred in the reverse direction through the guide roller 141.

As the buffer roller 143 moves from the bottom to the top as described above, the running length in the reverse direction of the electrolyte membrane sheet 9 is compensated to inhibit unwinding of the electrode layer rewinder 70, and the electrolyte membrane sheet 9 can be reversed by the guide roller 141.

Accordingly, the anode and cathode layers 5, 7 (A) to be detected are positioned in front of the driving bonding roll 30 and driven bonding roll 40 (original position), and the other anode and cathode layers 5, 7 (B) is positioned between the driving bonding roll 30 and the driven bonding roll 40.

Figure 9:
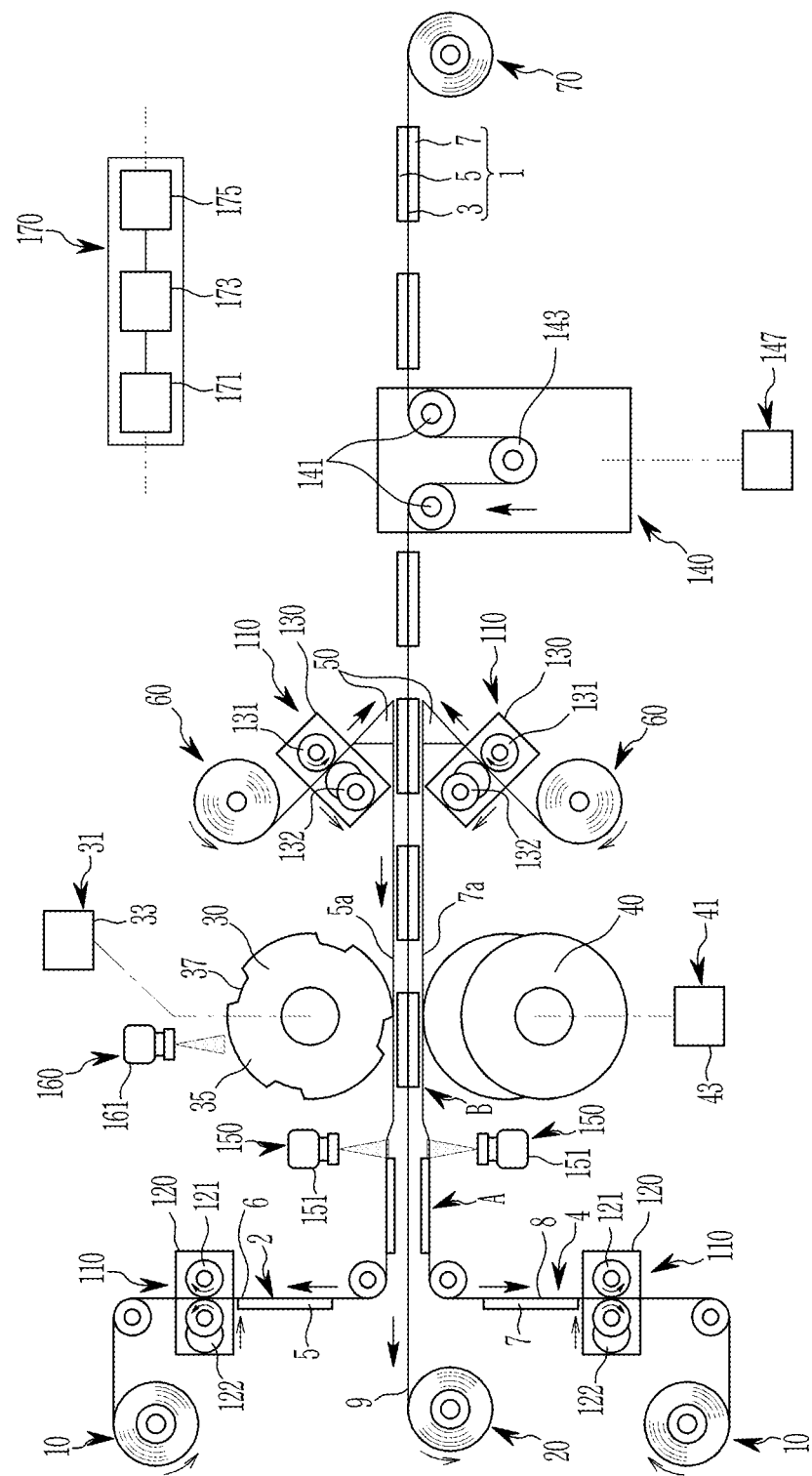

In this state, as shown in FIG. 9, the upper and lower electrode film sheets 2, 4 run in reverse as much as the position difference value, and the anode and cathode layers 5, 7 of the detection target are aligned in a predetermined matching position. At the same time, the driving bonding roll 30 is driven in the reverse direction as long as the empty portions 5a, 7a, and the embossing portion 37 of the driving bonding roll 30 is aligned to a predetermined matching position at step S26.

Then, the first and second position sensors 150, 160 re-detect the anode and cathode layers 5, 7 of the detection target and the positions of the embossing portion 37, and the detection signal is output to the controller 170 at step S27.

Here, the separated upper and lower electrode films 6, 8 may be individually corrected for their positions by the upper and lower the first turn roll set 120 and the upper and lower the second turn roll set 130, respectively.

That is, the controller 170 can correct the separated upper and lower electrode films 6, 8 each position by outputting the corresponding signal to the first turn roll set 120 and the upper and lower the second turn roll set 130 according to the detection signals of each of the upper and lower first position sensors 150 and the second position sensor 160.

Figure 10:
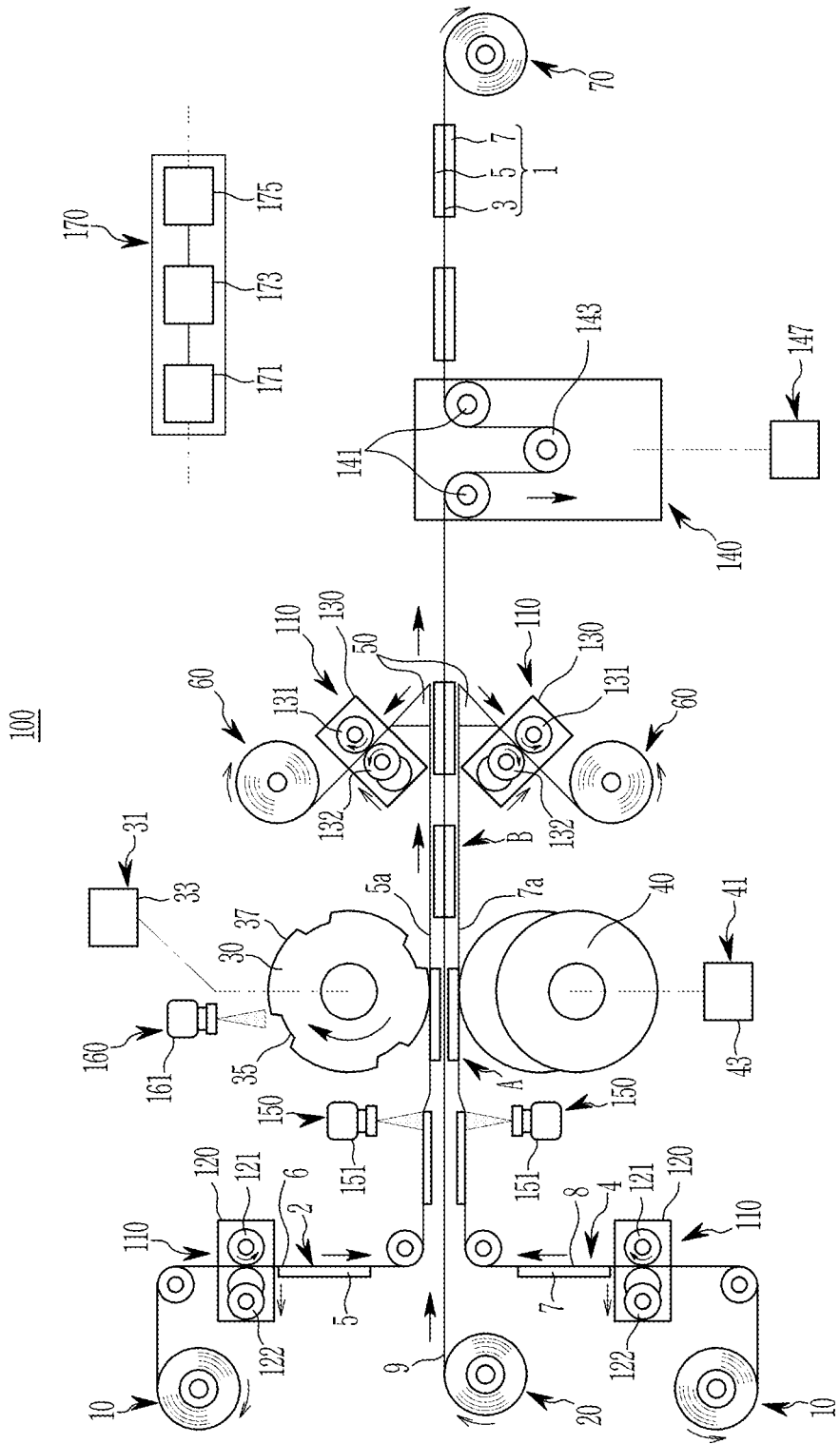

If it is determined that the position difference value satisfies the predetermined reference value at step S28, as shown in FIG. 10, the upper and lower electrode film sheets 2 and 4, and the electrolyte membrane sheet 9 are transferred in the positive direction, and the anode and cathode layers 5 and 7 aligned in the matching position are placed between driving bonding roll 30 and driven bonding roll 40.

This is to inhibit overlapping compression of other anode and cathode layers 5 and 7 bonded to the electrolyte membrane sheet 9 by the driving bonding roll 30 and driven bonding roll 40.

Next, the process of S11-S15 as described above is performed, such as the driven bonding roll 40 being lowered, and the anode and cathode layers 5 and 7 are transferred to the upper and lower surfaces of the electrolyte membrane sheet 9.

And, if it is determined that the position difference value does not satisfy the predetermined reference value at step S28, the process of S25-S27 as described above is performed.

According to the manufacturing apparatus 100 and method of the membrane-electrode assembly for fuel cells according to an exemplary form of the present disclosure as described so far, by switching the running directions of upper and lower electrode film sheets 2 and 4 and upper and lower electrode films 6 and 8, the transfer positions of the anode layer 5 and cathode layer 7 can be automatically aligned.

Thus, in an exemplary form of the present disclosure, it is possible to inhibit a decrease in the transfer uniformity of the anode and cathode layers 5 and 7 due to the pitch distribution between the anode and cathode layers 5 and 7 applied to the upper and lower electrode films 6 and 8. In addition, good quality of membrane-electrode assembly 1 can be provided, and productivity of membrane-electrode assembly 1 can be improved.

While this disclosure has been described in connection with what is presently considered to be practical exemplary forms, it is to be understood that the disclosure is not limited to the disclosed forms. On the contrary, it is intended to cover various modifications and equivalent arrangements included within the spirit and scope of the appended claims.

<Description of symbols>

| | |
|---|---|
| 1: membrane-electrode assembly | |
| 2: upper electrode film sheet | |
| 3: electrolyte membrane | 4: lower electrode film sheet |
| 5: anode layer | 5a, 7a: empty portion |
| 6: upper electrode film | 7: cathode layer |
| 8: lower electrode film | 9: electrolyte membrane sheet |
| 10: electrode film sheet unwinder | |
| 20: electrolyte membrane sheet unwinder | |
| 30: driving bonding roll | 31: first driver |
| 33, 124a, 136a: servo motor | 35: engraved portion |
| 37: embossing portion | 40: driven bonding roll |
| 41: second driver | 43, 123a, 135a: driving cylinder |
| 50: separation blade | 60: film rewinder |
| 70: electrode layer rewinder | 100: manufacturing apparatus |
| 110: position aligning unit | 120: first turn roll set |
| 121: first driven roller | 122: first driving roller |
| 123: third driver | 124: fourth driver |
| 130: second turn roll set | 131: second driven roller |
| 132: second driving roller | 135: fifth driver |
| 136: sixth driver | 140: buffering portion |
| 141: guide roller | 143: buffer roller |
| 147: seventh driver | 150: first position sensor |
| 151, 161: vision sensor | 160: second position sensor |
| 170: controller | 171: signal processing unit |
| 173: operation unit | 175: signal application unit. |

What is claimed is:

1. A manufacturing apparatus of a membrane-electrode assembly for a fuel cell, the manufacturing apparatus comprising:

an electrode film sheet unwinder configured to supply, along a predetermined transfer path, upper and lower electrode film sheets having upper and lower electrode films, wherein the upper and lower electrode films include anode and cathode layers applied at predetermined intervals;

an electrolyte membrane sheet unwinder that supplies an electrolyte membrane sheet between the upper and lower electrode film sheets along the transfer path;

a driving bonding roll that is driven rotatably in a first direction on the transfer path, and has an engraved portion and an embossing portion continuously formed on an exterior circumference surface of the driving bonding roll;

a driven bonding roll configured to: be moved in a vertical direction toward the driving bonding roll, be in close contact with the driving bonding roll, have the electrolyte membrane sheet and the upper and lower electrode film sheets interposed therebetween, and to rotate in a second direction;

a film rewinder on upper and lower sides of the transfer path, configured to recover by winding the upper and lower electrode films respectively; and a position aligning unit provided on the electrode film sheet unwinder and the film rewinder, and configured to align positions of the anode and cathode layers while switching running directions of the upper and lower electrode film sheets and the upper and lower electrode film.

2. The manufacturing apparatus of claim 1, further comprising:

a separation blade installed on upper and lower sides of the transfer path, respectively, and configured to separate the upper electrode film and the anode layer, and the lower electrode film and the cathode layer, respectively; and an electrode layer rewinder configured to wind a membrane-electrode assembly, in which the anode and cathode layers are transferred to upper and lower surfaces of the electrolyte membrane sheet by the driving bonding roll and driven bonding roll at an end of the transfer path.

3. A manufacturing apparatus of a membrane-electrode assembly for a fuel cell, the manufacturing apparatus comprising:

an electrode film sheet unwinder configured to supply, along a predetermined transfer path, upper and lower electrode film sheets having upper and lower electrode films, wherein the upper and lower electrode films include anode and cathode layers applied continuously at predetermined intervals;

an electrolyte membrane sheet unwinder that supplies an electrolyte membrane sheet between the upper and lower electrode film sheets along the transfer path;

a driving bonding roll that is driven rotatably in a first direction by a first driver on the transfer path, and has an engraved portion and an embossing portion continuously formed on an exterior circumference surface of the driving bonding roll;

a driven bonding roll configured to be moved in a vertical direction by a second driver toward the driving bonding roll, be in close contact with the driving bonding roll, have the electrolyte membrane sheet and the upper and lower electrode film sheets interposed therebetween, and rotate in a second direction which is opposite to the first direction;

a film rewinder on upper and lower sides of the transfer path, configured to recover by winding the upper and lower electrode films;

a first turn roll set on an electrode film sheet supply path of the electrode film sheet unwinder side, configured to selectively switch driving directions of the upper and lower electrode film sheets along the electrode film sheet supply path by third and fourth drivers;

a second turn roll set on an electrode film recovery path of the film rewinder side, configured to selectively switch driving directions of the upper and lower electrode films along the electrode film recovery path by fifth and sixth drivers;

a first position sensor installed in front of the driving bonding roll and driven bonding roll and configured to detect edge positions of the anode and cathode layers;

a second position sensor installed on the driving bonding roll side and configured to detect an edge position of the embossing portion; and a controller that is configured to analyze a detection signal received from the first and second position sensors, and control driving of the first to sixth drivers according to the edge position of the embossing portion and the edge positions of the anode and cathode layers.

4. The manufacturing apparatus of claim 3, further comprising:
 a separation blade installed on the upper and lower sides of the transfer path and configured to separate the upper electrode film and the anode layer, and the lower electrode film and the cathode layer, respectively;
 an electrode layer rewinder configured to wind a membrane-electrode assembly, in which the anode and cathode layers are transferred to upper and lower surfaces of the electrolyte membrane sheet by the driving bonding roll and driven bonding roll at an end of the transfer path; and
 a buffering portion provided between the separation blade and the electrode layer rewinder and configured to compensate for a reverse running length of the electrolyte membrane sheet.

5. The manufacturing apparatus of claim 4, wherein the buffering portion comprises:
 a pair of guide rollers configured to guide the electrolyte membrane sheet in both directions along the transfer path; and
 a buffer roller that is installed, and configured to be moved in the vertical direction by a seventh driver between the pair of guide rollers and to control a running length of the electrolyte membrane sheet.

6. The manufacturing apparatus of claim 3, wherein:
 the first and second position sensors include a vision sensor configured to simultaneously photograph an edge of the anode and cathode layer and an edge of the embossing portion, and outputs a vision data to the controller; and
 the first driver includes a servo motor, and the second driver includes a driving cylinder.

7. The manufacturing apparatus of claim 3, wherein the first turn roll set comprises:
 a first driven roller configured to freely rotate and be in contact with the upper and lower electrode film sheets running along the supply path; and
 a first driving roller configured to reciprocally move in a direction moving away or toward the first driven roller by the third driver, and to rotate in a direction opposite to a rotation direction of the first driven roller by the fourth driver.

8. The manufacturing apparatus of claim 7, wherein the third driver includes a driving cylinder, and the fourth driver includes a servo motor.

9. The manufacturing apparatus of claim 3, wherein the second turn roll set comprises:
 a second driven roller configured to freely rotate and in contact with the upper and lower electrode film running along the recovery path; and
 a second driving roller configured to:
  reciprocally move in a direction moving away from or toward the second driven roller by the fifth driver, and
  rotate in a direction opposite to a rotation direction of the second driven roller by the sixth driver.

10. The manufacturing apparatus of claim 9, wherein the fifth driver includes a driving cylinder, and the sixth driver includes a servo motor.

11. The manufacturing apparatus of claim 3, wherein the controller comprises:
 a signal processing unit configured to analyze the detection signal of the first position sensor and detect edge position values of the anode and cathode layers and to be matched with edge position values of the embossing portion, and to analyze the detection signal of the second position sensor and detect the edge position value of the embossing portion to be matched with the edge position value of the anode and cathode layers;
 an operation unit configured to calculate a position difference value between the edge position values of the anode and cathode layers and the edge position values of the embossing portion; and
 a signal application unit configured to apply a control signal to at least one of the first to six drivers according to the position difference value.

12. A manufacturing method of a membrane-electrode assembly for a fuel cell, the manufacturing method comprising the steps of:
 (a) supplying, by an electrolyte membrane sheet unwinder, an electrolyte membrane sheet to a predetermined transfer path;
 (b) supplying, by an electrode film sheet unwinder, along the transfer path, upper and lower electrode film sheets having upper and lower electrode films, wherein the upper and lower electrode films include anode and cathode layers applied at predetermined intervals through the electrode film sheet unwinder to upper and lower sides of the electrolyte membrane sheet;
 (c) bonding, by a driving bonding roll and a driven bonding roll, the anode and cathode layers of the upper and lower electrode film sheets to upper and lower surfaces of the electrolyte membrane sheet, respectively;
 (d) recovering, by a film rewinder, the upper and lower electrode films of the upper and lower electrode film sheets, respectively;
 (e) detecting, by a second position sensor, edge positions of the anode and cathode layers at a front side of the driving bonding roll and the driven bonding roll through a first position sensor, and detecting an edge position of an embossing portion of the driving bonding roll; and
 (f) switching, by first and second turn roll sets, running directions of the upper and lower electrode film sheet in the electrode film sheet unwinder and running directions of the upper and lower electrode film in the film rewinder, respectively, according to detection signals of the first and second position sensors, and aligning transfer positions of the anode and cathode layers.

13. The manufacturing method of claim 12, wherein in (a), (b), (c) and (d) steps of the method,
 the driven bonding roll is raised,
 the driving bonding roll is driven and rotated,
 a first driving roller of the first turn roll set is separated from a first driven roller,
 a second driving roller of the second turn roll set is in close contact with a second driven roller, and
 the second driving roller is driven along a direction of recovery of the upper and lower electrode films.

14. The manufacturing method of claim 13, wherein in (a), (b), (c) and (d) steps of the method comprise;
 separating, by a separation blade, the upper and lower electrode films and the anode and cathode layers of the upper and lower electrode film sheets, respectively; and
 with a buffer roller of a buffering portion lowered, transferring, by an electrode layer rewinder, in a positive direction, winding a membrane-electrode assembly having the anode and cathode layers transferred to the upper and lower surfaces of the electrolyte membrane sheet.

15. The manufacturing method of claim 12, wherein the (f) step of the method comprises:

by a controller, analyzing the detection signal of the first position sensor and detecting an edge position value of the anode and cathode layers to be matched with an edge position value of the embossing portion;

by the controller, analyzing the detection signal of the second position sensor and detecting the edge position value of the embossing portion to be matched with the edge position value of the anode and cathode layers; and calculating, by the controller, a position difference value between the edge position value of the anode and cathode layer and the edge position value of the embossing portion.

16. The manufacturing method of claim 15, wherein the (a), (b), (c), and (d) steps of the method are performed when it is determined, by the controller, that the position difference value satisfies a predetermined reference value.

17. The manufacturing method of claim 15, the method further comprising:

when it is determined, by the controller, that the position difference value does not satisfy a predetermined reference value, performing (a)-(d) steps of the method in an electrode position alignment mode;

bonding, by the driving bonding roll and driven bonding roll, preceding anode and cathode layers to the upper and lower surfaces of the electrolyte membrane sheet; and when an empty portion between the anode and cathode layers of a sensing target is positioned at an edge of the embossing portion of the driving bonding roll, stopping transfer of the upper electrode film sheet, the lower upper electrode film sheet and the electrolyte membrane sheet.

18. The manufacturing method of claim 17, wherein in the electrode position alignment mode, after stopping transfer of the electrolyte membrane sheet, the driven bonding roll is lowered, the first driving roller of the first turn roll set is separated from a first driven roller, the second driving roller of the second turn roll set is in close contact with a second driven roller, the second driving roller is driven and rotated along a recovery direction of the upper and lower electrode films, the upper and lower electrode film sheets are transferred in a positive direction along the transfer path by the electrode film sheet unwinder and film rewinder, and the anode and cathode layers as detection targets are transferred to a separation blade, and the upper and lower electrode films are separated from the anode and cathode layers bonded to the electrolyte membrane sheet by the separation blade.

19. The manufacturing method of claim 18, wherein in the electrode position alignment mode, after separation of the upper and lower electrode films, the first driving roller of the first turn roll set is in close contact with the first driven roller, the first driving roller is rotated in supply opposite directions of the upper and lower electrode film sheets, the upper and lower electrode film sheets are driven in the supply opposite directions, the second driving roller of the second turn roll set is separated from the second driven roller, the upper and lower electrode films are driven in opposite directions, and a buffer roller of a buffering portion is moved in an upper direction, and the electrolyte membrane sheet with the anode and cathode layers transferred to the upper and lower surfaces is transferred in a reverse direction in which the electrolyte membrane sheet with the anode and cathode layers proceeds toward the electrode film sheet unwinder.

20. The manufacturing method of claim 19, wherein in the electrode position alignment mode, the anode and cathode layers of the detection target are positioned in front of the driving bonding roll and driven bonding roll, the anode and cathode layers bonded to the electrolyte membrane sheet are positioned between the driving bonding roll and driven bonding roll, the anode and cathode layers of the detection target are aligned in a predetermined matching position, the driving bonding roll is driven and rotated in the reverse direction corresponding to a section of the empty portion, the embossing portion is aligned in a predetermined matching position, and the anode and cathode layers of the detection target and the positions of the embossing portion are re-detected by the first and second position sensors, and the detection signal is output to the controller.

* * * * *